A. P. LAMBERT.
TRAP.
APPLICATION FILED JULY 2, 1910.

986,015.

Patented Mar. 7, 1911.

Witnesses
Arthur P. Rice
C. R. Rice

Inventor
A. P. Lambert
By J. W. H. George
Attorney

UNITED STATES PATENT OFFICE.

ANDREW P. LAMBERT, OF CORPUS CHRISTI, TEXAS.

TRAP.

986,015. Specification of Letters Patent. Patented Mar. 7, 1911.

Application filed July 2, 1910. Serial No. 570,146.

*To all whom it may concern:*

Be it known that I, ANDREW P. LAMBERT, a citizen of the United States, residing at Corpus Christi, in the county of Nueces and State of Texas, have invented certain new and useful Improvements in Traps, of which the following is a specification.

This invention relates to certain improvements in traps and is especially adapted in use for catching insects, or small animals such as field mice.

A further object is to provide a device of such character that is simple and cheap in construction and that has means for readily emptying the entrapped insects or animals.

These objects are obtained by the construction shown in the accompanying drawings, in which:—

Figure 1:
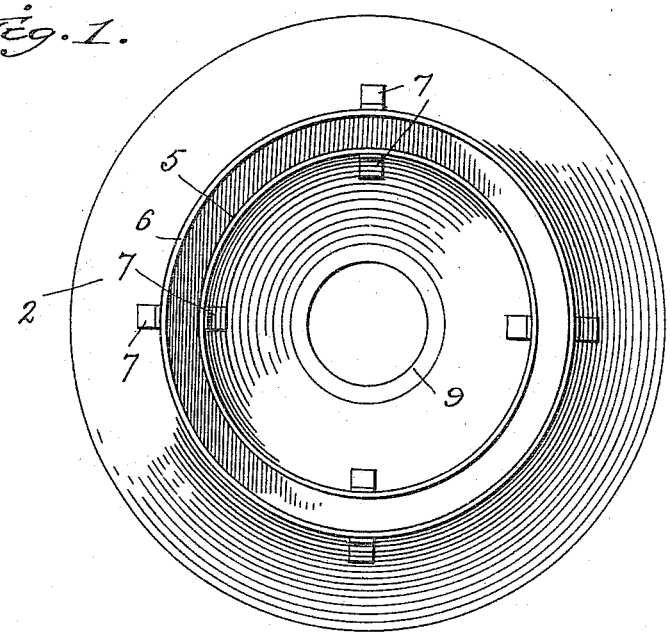
Figure 2:
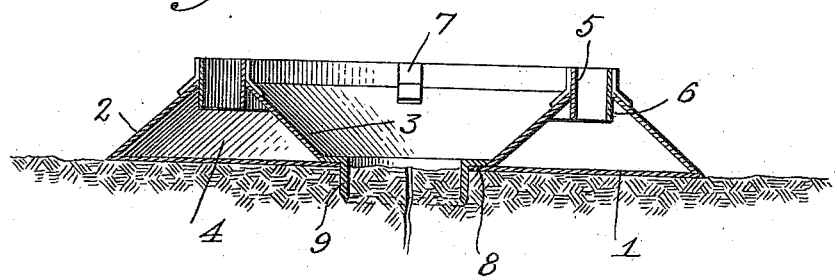

Figure 1 is a plan view of the device, and Fig. 2 a vertical section through the same.

Similar numerals on the drawings indicate corresponding parts.

The body of the trap is formed of bottom plate 1 and inclined side walls 2 and 3 secured thereto, said side walls being formed annular and inclined toward each other at the top, leaving an open mouth entirely around the circumference. These side walls and bottom form an annular chamber 4 triangular in cross-section in which the insects or animals are entrapped.

Fitted in the groove at the top of the trap are the removable annular rings 5 and 6 vertically disposed, which are held in position by the supports 7 which rest upon the inclined side walls 2 and 3, said annular rings project above and below the top of the body of the trap, forming an entrance with vertical walls and within the trap depending obstructions to prevent the escape of the entrapped insects or animals, and deflectors or shields above the mouth to prevent blowing sands or debris from filling the trap or obstructing said mouth.

To secure the trap in position upon the ground I preferably form the bottom of the trap with a central annular ledge 8, upon which is driven an angular annular collar 9 which holds the trap in position. Collar 9 is preferably formed separate from the trap proper, so that, it can be made of heavier material for the purpose described. It is obvious that said collar can be made integrally with the bottom plate of the trap.

It will be observed that with this construction I provide a trap that can be readily secured in position around an insect hole or nest, and that the inclined side walls form leadways from said nest, or from the outside, to the entrance of the trap, also by making the flanged rings 5 and 6 removable the contents of the trap can be removed without trouble.

In operation the trap is placed upon the ground and secured in position by the collar 9 which is driven into the ground and its overhanging flange engaging the portions 8 of the body. In setting the trap for ants it is preferably placed around the ant hole or the nest.

Having thus fully described my invention what I claim is:—

A trap of the character described, comprising bottom and side walls forming an annular chamber triangular in cross-section and having an open mouth at its top, the sides of said trap sloping toward each other, and vertically disposed rings detachably supported in said mouth, the lower portion of which depend into the annular chamber and their upper portion extending above the mouth, whereby a vertical passage-way is formed, which extends above the trap proper, the side walls of said passage-way above the trap body forming deflectors or shields, and supports for said rings.

In testimony whereof I affix my signature in presence of two witnesses.

ANDREW P. LAMBERT.

Witnesses:
HERMAN MEULY,
M. A. MAUPIN.

---

Copies of this patent may be obtained for five cents each, by addressing the "Commissioner of Patents, Washington, D. C."